Patented Aug. 9, 1932

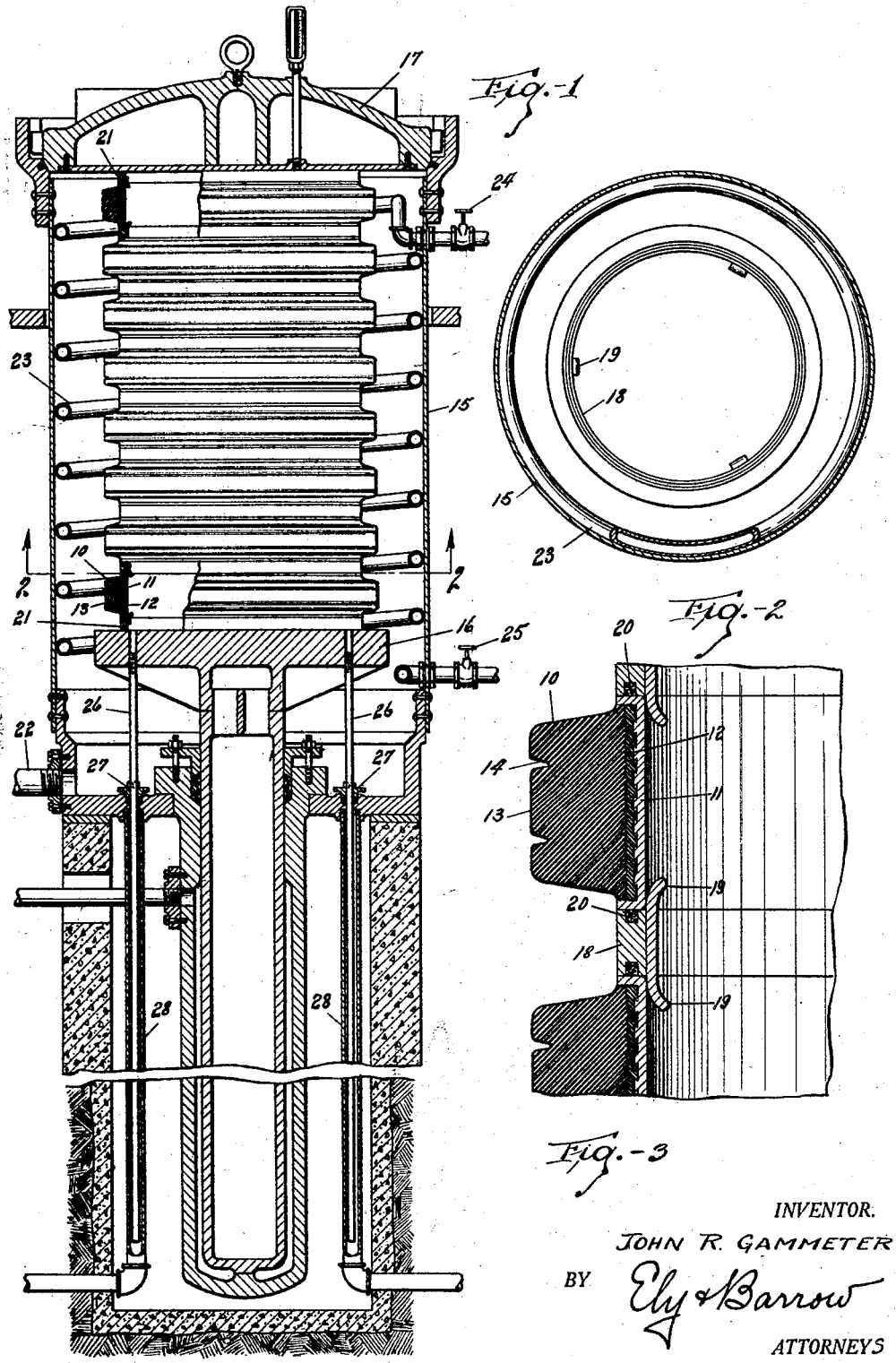

1,870,805

UNITED STATES PATENT OFFICE

JOHN R. GAMMETER, OF AKRON, OHIO

METHOD AND APPARATUS FOR CURING SOLID TIRES

Application filed March 25, 1929. Serial No. 349,547.

This invention relates to procedure and apparatus for curing solid rubber tires.

Solid rubber tires comprise a metal rim or base upon which a body of tough, resilient rubber is vulcanized by means of an intervening layer of comparatively hard rubber bonded to the resilient body of the tire and to the base by vulcanization to produce an integral construction.

The curing of solid tires has presented considerable difficulties due to the fact that a large body of comparatively soft, cushion rubber and the hard rubber base have been cured at a single operation. In order to cure the hard base, a high temperature is needed which will oftentimes result in overcuring the outer surface of the cushion rubber or undercuring of the interior of the cushion. The present invention has for its object the overcoming of these difficulties, making it possible to apply a high degree of heat to the hard base to properly cure it, and applying a lower degree of heat to the cushion portion of the tire for a longer period to properly more uniformly cure the whole of the cushion rubber.

Specifically the invention has for its object the provision of a method and apparatus by which the tires may be initially set in the desired shape in molds and then removed from the molds and subjected to different conditions of vulcanization about the outer and inner peripheries thereof.

The foregoing and other objects of the invention are attained by the method and apparatus illustrated in the accompanying drawing and described below.

Of the accompanying drawing,

Figure 1 is a diametral vertical section through a vulcanizer embodying the invention showing a stack of tires therein;

Figure 2 is a section on line 2—2 of Figure 1; and

Figure 3 is an enlarged detail radial section of the tire stack.

In practicing the invention, the tires are built up on their bases in any suitable way and are placed in molds wherein they are subjected to pressure and some heat, if desired, to set the tires in their final shape. The pre-molded tires are then removed from the molds for vulcanization.

Referring to the drawing, the pre-molded tires are shown at 10 and include a base 11, a layer of hard rubber compound 12 and a body of tough, resilient rubber compound 13 which may be pre-molded to any desired shape and provided with the usual tread depressions 14.

For vulcanizing the tires 10, a heater 15 of the usual construction may be employed which is provided with a hydraulic ram 16 operable through the bottom of the heater from the bottom to the top thereof. The heater has an open top with a bayonet jointed closure or lid 17 whereby a stack of tires may be held clamped between the ram 16 and lid 17 during vulcanization.

To carry out the present invention, sealing rings 18, adapted to be assembled with the tires to provide a stack, are employed, these rings being of the diameter of the tire bases and being provided with inner inwardly flared flanges 19 for aligning the molds and rings, whereby the tires and rings may be assembled alternately to support a stack of tires on ram 16 while ram 16 is being lowered in the heater as will be understood by skilled artisans. The tire base contacting edges of the rings 18 are provided with gaskets 20 and suitable sealing rings 21 also gasketed are utilized between the lowermost tire and the ram and between the uppermost tire and lid whereby the space up through the center or inside of the tire stack will be sealed from the space surrounding the tire stack when clamping pressure is applied by the ram 16 through the stack against the lid 17.

By this arrangement it is possible to supply steam, hot water or any other suitable fluid curing medium at one temperature to the inside of the stack and to supply a fluid curing medium at a different temperature to the outside of the stack and also to subject the tires to these curing mediums for different periods of vulcanization if required.

Since the rubber body portions of the tires at the outside of the stack are preferably subjected to direct action of the fluid medium, a liquid such as hot water may be used as a curing medium whereby any desired hydrostatic pressure may be applied to the tires during vulcanization to secure the desired density in these portions of the tires and to prevent blistering, etc.

Accordingly, a water inlet and drain connection may be provided at 22 and a coil 23 may be arranged in the heater 15 about the stack through which a heated fluid medium may be circulated to maintain the curing water at the required temperature, circulation of the heated medium through the coil being controlled by valves 24 and 25. Supply of the heating medium to the interior of the stack may be arranged for by use of piping 26, 26 connected to openings through the bottom of the ram and slidable through suitable stuffing boxes 27, 27 in the bottom of the heater in telescopic relation with supply pipes 28, 28.

To vulcanize the tires, they are subjected to the action of the required temperature inside the stack and to the required temperature and pressure outside the stack for the required periods of time which depends upon the nature of compounds employed. The temperature within the stack will usually be higher and the vulcanization from the inside is carried on for a period sufficient to vulcanize the hard rubber compound.

Upon completion of the vulcanization, the supplies of the curing mediums are cut off, the heater drained or blown off as the case may be in the usual way and the pressure of ram 16 relieved whereby the lid 17 may be removed and the stack elevated out of the heater by the ram, the stack being disassembled as the ram is raised.

It will appear from the foregoing that simple, effective procedure and apparatus for making solid tires has been provided by the invention. Obviously modifications of this invention may be resorted to without departing from the spirit thereof or the scope of the appended claims.

What is claimed is:—

1. A method of making solid rubber tires including a base, a resilient body and a layer of hard rubber between said base and said body, said method comprising pre-molding said tires to set them in the desired shape, stacking said premolded tires with sealing rings in a heater to provide spaces respectively about the tire stack and inside the tire stack which are sealed from each other, and subjecting the base and tread portions of the tires to temperatures without further molding for the periods required respectively, by introduction of fluid curing mediums to said spaces to vulcanize the body portions and the hard rubber portions of the tires, said body portion of the tires being subjected to direct pressure by the curing medium about the stack.

2. A method of making solid rubber tires including a base, a resilient body and a layer of hard rubber between said base and said body, said method comprising pre-molding said tires to set them in the desired shape, stacking said tires with non-molding sealing rings in a heater to provide spaces respectively about the tire stack and inside the tire stack which are sealed from each other, and subjecting the base and tread portions of the tire to temperatures without further molding for the periods required respectively by introduction of fluid curing mediums to said spaces to vulcanize the body portions and the hard rubber portions of the tires.

3. A method for making solid tires comprising a base, a body portion of resilient rubber and a layer of hard rubber connecting the body to the base, said method comprising pre-molding the tires to set them in the desired shape, and subjecting the tires to vulcanizing mediums at different temperatures respectively applied to the base and tread of the tires, the fluid medium about the tread of the tires being under pressure and applied directly against the entire rubber surface of the tire.

4. A method of making solid rubber tires including a base, a resilient body and a layer of hard rubber between said base and said body, said method comprising pre-molding said tires to set them in the desired shape, stacking said tires with non-molding sealing rings in a heater to provide spaces respectively about the tire stack and inside the tire stack which are sealed from each other, and subjecting the tread and base portions of the tires to temperatures for the periods required respectively, by introduction of fluid curing mediums to said spaces to vulcanize the body portions and the hard rubber portions of the tires without further molding, said body portion of the tires being subjected to direct pressure by the curing medium about the stack, the fluid medium supplied about the stack being a hot liquid under pressure.

5. A method for making solid tires comprising a base, a body portion of resilient rubber and a layer of hard rubber connecting the body to the base, said method comprising pre-molding the tires to set them in the desired shape, and subjecting the tires to fluid vulcanizing mediums at different temperatures respectively applied to the bases and treads of the tires, the fluid medium about the treads of the tires being under pressure and applied directly against the body portion of the tire, the fluid medium supplied about the tire being a hot liquid under pressure.

6. A method of making solid rubber tires including a base, a resilient body and a layer of hard rubber between said base and said body, said method comprising stacking said tires with non-molding sealing rings in a heater to provide spaces respectively about the tire stack and inside the tire stack which are sealed from each other, and subjecting the base and tread portions of the tires to temperatures for the periods required respectively by introduction of fluid curing mediums to said spaces to vulcanize the body portions and the hard rubber portions of the tires, said body portion of the tire and the inner periphery of the base being subjected to direct pressure by the curing medium about the stack.

7. A method of making solid rubber tires including a base, a resilient body and a layer of hard rubber between said base and said body, said method comprising stacking said tires with non-molding sealing rings in a heater to provide spaces respectively about the tire stack and inside the tire stack which are sealed from each other, and subjecting the tread and base portions of the tires to temperatures for the periods required respectively by introduction of fluid curing mediums to said spaces to vulcanize the body portions and the hard rubber portions of the tires.

8. A method of making solid tires including a base, a resilient body and a layer of hard rubber between said base and said body, said method comprising stacking said tires with sealing rings in a heater to provide spaces respectively about the tire stack and inside the tire stack which are completely sealed from each other, and subjecting the tread and base portions of the tires to temperatures for the periods required respectively, by introduction of fluid curing mediums to said spaces to vulcanize the body portions and the hard rubber portions of the tires, said body portion of the tires being subjected to direct pressure by the curing medium about the stack and said inner peripheries of the bases of said tires being subjected to direct contact with the curing medium inside the tire stack, the fluid medium supplied about the stack being a hot liquid under pressure.

9. A method for making solid tires comprising a base, a body portion of resilient rubber and a layer of hard rubber connecting the body to the base, said method comprising subjecting the tires to vulcanizing mediums at different temperatures respectively applied to the base and tread of the tires, the fluid medium about the outside of the tires being under pressure and applied directly against the body portion of the tire and said inner peripheries of the bases of said tires being subjected to direct contact with the curing medium inside the tire stack, the fluid medium supplied about the tire being a hot liquid under pressure.

10. That method of vulcanizing solid rubber tires comprising a body portion of a rubber compound secured to a rim which comprises pre-molding the tires to set them in the desired shape, vulcanizing the tire from without under the required conditions for curing the compound of the body portion, and vulcanizing the tire at the base at the required temperature for securing adhesion of the tire to the rim, the body portion of the tire being maintained under hydrostatic pressure while being vulcanized.

11. Apparatus for vulcanizing solid tires comprising a heater, means for stacking tires in the heater including non-molding sealing rings adapted to be assembled with the tires in a stack to provide a space about the stack and a space inside the stack sealed from each other, and means for supplying curing mediums at different temperatures to said spaces.

12. Apparatus for vulcanizing solid tires comprising a heater, means for stacking tires in a heater to provide a space about the stack and a space inside the stack sealed from each other, said means being constructed so that the inner peripheries of said tires are completely exposed to the space inside the stack and so that the complete outer surface of the tires are exposed to the space about the stack and means for supplying curing mediums at different temperatures to said spaces.

JOHN R. GAMMETER.